Patented Feb. 24, 1925.

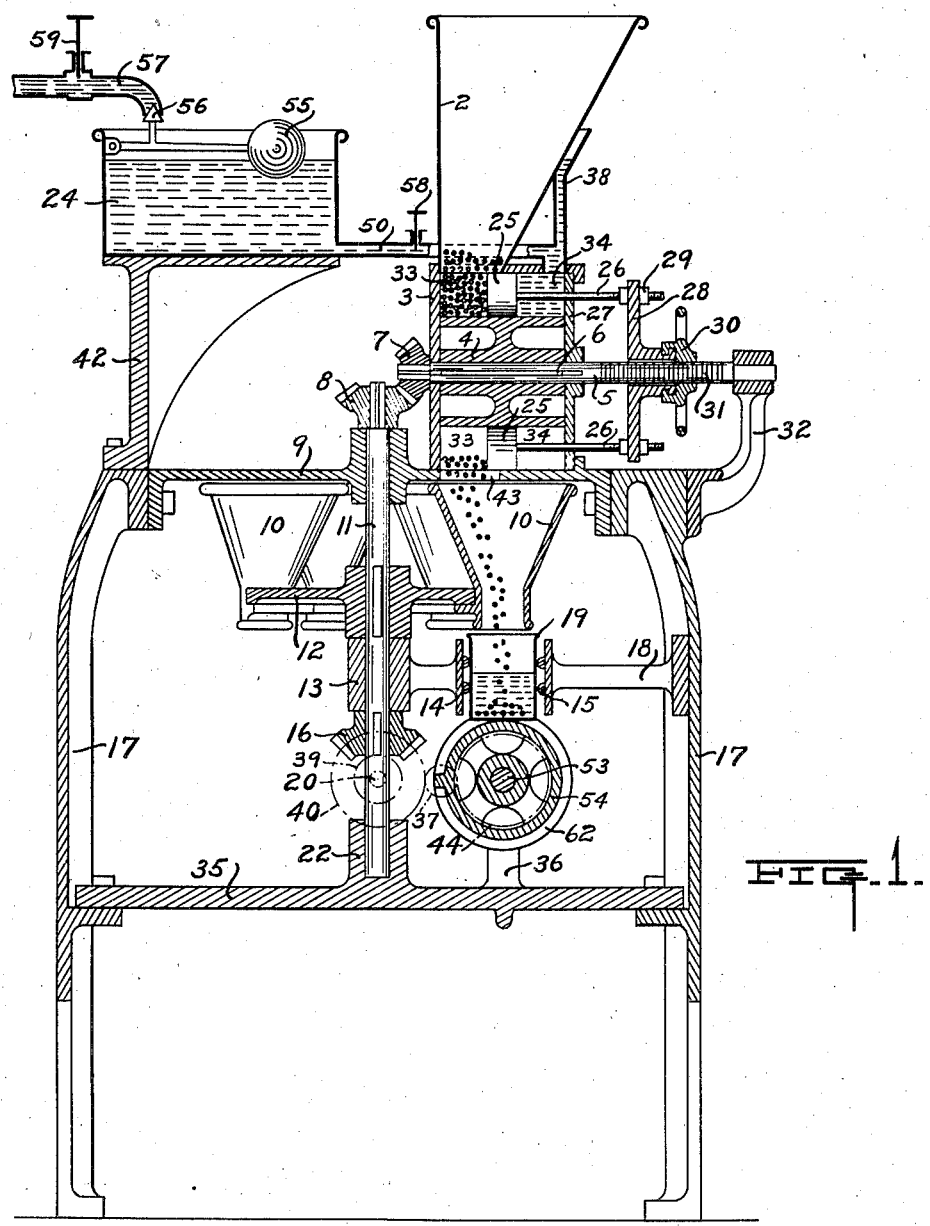

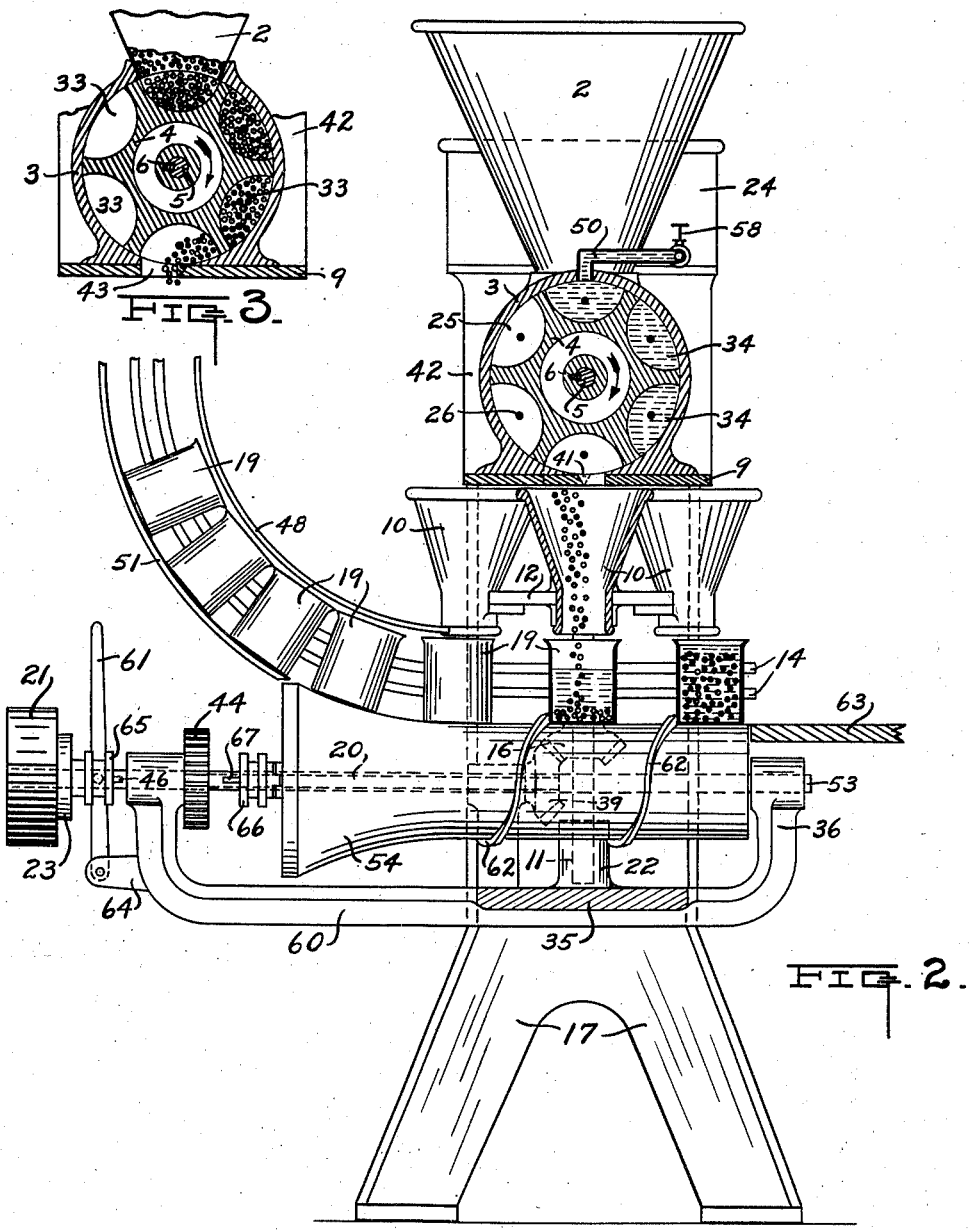

1,527,406

UNITED STATES PATENT OFFICE.

OSWALD H. HANSEN, OF PORT WASHINGTON, WISCONSIN, ASSIGNOR, BY DIRECT AND MESNE ASSIGNMENTS, TO HANSEN CANNING MACHINERY CORPORATION, A CORPORATION OF WISCONSIN.

APPARATUS FOR FILLING CANS.

Application filed December 10, 1919. Serial No. 343,698.

*To all whom it may concern:*

Be it known that OSWALD H. HANSEN, a citizen of the United States, residing at Port Washington, in the county of Ozaukee and State of Wisconsin, has invented a certain new and useful Apparatus for Filling Cans, of which the following is a specification.

This invention relates in general to an improved method of and apparatus for feeding measured quantities of several kinds of material to receptacles, and relates specifically to an improved method of and apparatus for automatically filling cans with a mixture of liquid and relatively dry granular material.

An object of the invention is to provide a simple and efficient method of feeding liquid and granular materials to receptacles. Another object is to provide simple and efficient apparatus for commercially exploiting the method.

Prior to the origin of the method of and apparatus for filling cans disclosed in Patent No. 1,188,764, granted June 27, 1916, it was universal practice to fill successive cans with peas and brine, by first measuring a quantity of peas and delivering the same to a can, and by subsequently depositing upon the peas a quantity of brine sufficient to completely fill the remainder of the can. The cans thus completely filled were then tilted and some of the brine permitted to run off in order to provide the necessary clearance space in each can. This prior method of filling the cans has proven objectionable for several reasons, one of these being the time necessary in order to permit the brine to expel the air and completely fill the voids between the peas, and another being the waste of brine resulting from tilting the cans in order to provide the necessary clearance space. The first of these features results in reduction of the speed with which the substances may be packed as it necessitates retention in the filler, of each can for a considerable period of time. The second of these features entails considerable financial loss due to the resultant waste of valuable substances.

With the method of and apparatus for filling cans with peas and brine, set forth in Patent No. 1,188,764 above referred to, the first of these objectionable features of the prior art was partially remedied, and the second was entirely eliminated. In this improved method a predetermined quantity of peas was first measured and just sufficient brine was added to this predetermined quantity of peas to produce the exact amount of mixture which it was desired to have the finally filled can contain. This predetermined quantity of mixture was then delivered to the can.

In order to increase the capacity of these automatic filling machines, it was next proposed to more rapidly mix the materials by admitting the brine to the bottom of a premeasured charge of peas. In this manner the brine admitted under pressure was caused to rapidly expel the air upwardly from the voids between the peas and to produce a predetermined quantity of the mixture. The predetermined quantity of mixture was then delivered to a can. This method forms the subject of application Serial No. 197,809, filed October 22, 1917.

As an alternative of this latter method which has proven highly successful in commercial operation, it was next proposed to independently premeasure predetermined quantities of both peas and brine and to simultaneously deliver these predetermined quantities to a can. In this latter method the sum of the premeasured volumes of brine and peas after mixing, is exactly equal to the volume of the portion of the can which it is desired to finally fill. This method forms the subject of application Serial No. 214,205, filed January 28, 1918.

The present invention contemplates another alternative method whereby independent quantities of brine and peas are first accurately measured, and in which the premeasured quantity of brine is deposited in the can in advance of the quantity of peas. The sum of the quantities of materials premeasured is in each case exactly equal to the volume of the portion of the can which it is desired to finally fill. By first depositing the liquid in the can and subsequently dropping the peas into the liquid, the cans may be filled in an exceedingly short space of time and may be transported at a relatively high rate of speed past the delivery openings from the premeasuring devices. Besides greatly enhancing the rate of filling, the waste of materials is entirely eliminated with the present invention.

With the general objects of the invention thus broadly disclosed, the more specific objects will be apparent in the course of the following description.

While various specific terms have been employed throughout this specification, it should be understood that it is not intended to thereby limit the scope of the invention. The term "can" as employed herein is intended to refer to any form of receptacle. The term "filling" refers to either a partial or a complete filling of the receptacles. The term "peas" refers to any granular material having characteristics similar to those of peas. The term "brine" is intended to cover any liquid. The principles of the invention are applicable generally to machines for successively feeding measured quantities of relatively dry granular material and liquid to receptacles.

A clear conception of the several steps of the method and of one form of apparatus for exploiting the same, may be had by referring to the drawings accompanying and forming a part of this specification, in which like reference characters designate the same or similar parts in the various views.

Fig. 1 is a central vertical section through a can filling machine, showing the general construction thereof.

Fig. 2 is a transverse vertical section through the can filling machine, the section being taken through the brine measuring compartments of the premeasuring device.

Fig. 3 is a fragmentary transverse section through the can filling machine, the section being taken through the pea measuring compartments of the premeasuring device.

The can filling machine comprises in general material measuring and feeding mechanism, can supply and transporting mechanism, and suitable framing for supporting these mechanisms. The stationary main frame of the machine comprises a pair of spaced vertical side frames 17 connected at their upper ends by means of a horizontal upper frame 9 and at their lower portions by means of a horizontal lower frame 35. The material measuring mechanism comprises a cylindrical shell forming a measuring casing 3 mounted upon the upper frame 9 directly over the brine and pea delivery openings 41, 43 respectively, see Figs. 2 and 3. Within the casing 3 is mounted a rotary measuring element 4 having a series of parallel longitudinal recesses in the periphery thereof which form material measuring pockets. Within each of these recesses is located an adjustable partition 25 which divides the corresponding recess into a pea measuring chamber 33 at the right and a complementary brine measuring chamber 34 at the left of the partition. The partitions 25 are provided with parallel adjusting rods 26 which extend through the brine measuring chambers 34 and through the rotary end head 27, these rods 26 being adjustably secured to the common adjusting disk 28 by means of clamping nuts 29. The rotor 4 and the end plate 27 may be secured to the horizontal counter shaft 5 by means of a key 6, the shaft 5 being supported in end bearings in the casing 3 and bracket 32. The adjusting disk 28 is movable along the shaft 5 by means of an adjusting hand wheel 30 having screw thread coaction with a thread 31 on the shaft 5 and having lugs coacting with an annular recess in the hub of the disk 28.

The peas are supplied by gravity to the successive chambers 33 of the measuring element 4, from the pea hopper 2, being delivered through an upper opening in the casing 3. The hopper 2 is ordinarily provided with a suitable agitator which prevents bridging of the peas over the discharge opening, such agitator having been omitted as it forms no essential part of the present invention. The brine is supplied by gravity to the successive chambers 34 from the brine tank 24 through a brine pipe 50 communicating with an opening through the upper portion of the casing 3. The brine pipe 50 is provided with a brine control valve 58 and a vent pipe 38 communicating with the highest portion of the casing 3 and rising to a point above the liquid level in the tank 24. The brine is supplied to the tank 24 through a brine supply pipe 57 having a hand controlled valve 59 for completely shutting off the brine supply, and having a float controlled valve 56 controllable by a float 55 resting upon the liquid in the tank 24 and adapted to maintain a predetermined amount of brine in the tank. The brine tank is supported upon a bracket 42 which rests directly upon one of the side frames 17.

The horizontal counter shaft 5 has secured thereto a bevel pinion 7 which meshes with a bevel pinion 8 secured to the upper end of the vertical shaft 11, see Fig. 1. The main shaft 11 is supported at its upper end in a central bearing formed on the upper frame 9, and has its lower extremity fitted in a thrust bearing 22 formed on the lower frame 35. The lower portion of the shaft 11 is provided with a bevel gear 16 which meshes with a bevel gear 39 secured to one extremity of the horizontal counter shaft 20. The horizontal counter shaft 20 is supported in suitable bearings secured to the lower frame 35 and has its outer end provided with a spur gear 40 which meshes with an idler gear 37 which in turn meshes with a spur gear 44 secured to the horizontal power shaft 53. An annular series of funnels 10 is secured to a funnel support 12 which is vertically adjustably secured to the medial portion of the vertical shaft 11.

The can feeding and transporting mechanism comprises a can guide way cooperating with a rotary feed drum 54. The can guide way comprises a lower guide plate 51, an upper guide plate 48 and two pairs of side guides 14, 15. The successive cans 19 are delivered by gravity down a vertical portion of the guide way in horizontal position, and are righted by means of the curved portion of the guide way, see Fig. 2. The ends of the side guides 14, 15 extend through the machine, the guides 14 being supported by a bracket 13 associated with the shaft 11, and the guides 15 being supported by a bracket 18 associated with the side frame 17. The can transporting mechanism comprises a feeding and supporting drum 54 having a cylindrical portion provided with a helical projection 62 and having its end adjacent the can guide way, tapered or of substantially frusto-conical shape, see Fig. 2. This can supporting and feeding drum 54 is mounted upon the horizontal main power shaft 53 which is supported in bearings formed on the brackets 36, 60 secured to the lower frame 35. The delivery end of the feed drum 54 extends in proximity to a discharge plate 63. A jaw clutch 66 cooperable with a spline 67 on the shaft 53 and manipulable by means of a suitable lever not shown, serves to drivingly connect the drum 54 with the shaft 53. The end of the shaft 53 remote from the drum 54 is provided with a normally loose driving pulley 21 which derives power from any suitable source. A friction or other type of clutch 23 controllable by means of a manually operable lever 61 supported on a bracket 64 and coacting with the movable clutch element 65, serves to form a driving connection between the pulley 21 and the shaft 53. The movable clutch element 65 is drivingly connected to the shaft 53 by means of a spline 46.

During the normal operation of the machine, the operating lever 61 is shifted to drivingly connect the power pulley 21 with the power shaft 53 through the clutch 23. Rotation of the pulley 21 is then transmitted through the clutch 66 to the can feed drum 54, as well as directly to the spur gear 44. The rotating feed drum 54 receives the empty cans 19 in succession from the stationary can guide way and transports the cans in properly spaced relation, directly through the machine and delivers them upon the discharge plate 63. The rotary motion of the spur gear 44 is transmitted through the spur gears 37, 40 to the horizontal counter shaft 20 and from this counter shaft through the bevel gears 39, 16 to the vertical shaft 11. Rotation of the shaft 11 causes the funnels 10 to revolve and is further transmitted through the gears 8, 7 to the horizontal counter shaft 5 and measuring element 4. The brine tank 24 is then supplied with brine by opening the valve 59 and the hopper 2 is supplied with peas. When the valve 58 in the pipe 50 is opened, brine flows through the pipe 50 into the successive brine measuring chambers 34 at the right of the partitions 25. As the brine flows into the chambers 34, air escapes from these chambers through the vent pipe 38, the brine rising in this pipe to the level of the liquid in the tank 24. The successive chambers 33 at the left of the partitions 25 are automatically simultaneously filled with peas as these chambers come into communication with the discharge opening of the hopper 2. The chambers 33, 34 after being filled with peas and brine respectively, are advanced downwardly as indicated, due to rotation of the element 4. As the brine filled chambers 34 reach the discharge opening 41 their contents are delivered by gravity through the complementary funnels 10 and into the cans 19 below these funnels. As the pea filled chambers 33 reach the discharge openings 43 their contents are delivered by gravity through the complementary funnels 10 into the cans 19 below. By placing the brine delivery opening 41 in advance of the pea delivery opening 43 as shown in the drawing, it will be obvious that the brine is in each instance deposited in the can 19 considerably before any peas are deposited in the same can.

The sum of the volumes of each set of complementary chambers 33, 34 less the volume of the voids in the peas in a chamber 33 is exactly equal to the volume of the portion of a can 19 which it is desired to fill, so that each can will receive exactly the same volume of final mixture. The relative speeds of travel of the feed drum 54, funnels 10 and measuring element 4, are such that the measuring chambers 33, 34, funnels 10 and cans 19 will always cooperate to deliver one set of complementary premeasured batches of materials to each can 19.

If it is desired to relatively vary the proportions of brine and peas in each charge, without affecting the total volume of a batch of mixture, it is necessary only to shift the partitions 25 in the proper direction relatively to the element 4, by manipulating the hand wheel 30. As the percentage of voids in any given quantity of peas alone, is always substantially constant, any increase or decrease in the volume of voids in the measured quantities of peas due to adjustment of the partitions 25, is compensated for by the rods 26 which bear the same relation to the volumes of the liquid measuring chambers 34 as the voids bear to the actual volumes of the peas in the chambers 33. For example if the volume of the voids in the peas filling a chamber 33 is ten per cent of the total volume of that chamber, the volume of the portion of the rod 26 within the complementary brine chamber 34 will also be ten per cent of that chamber. In this manner the total actual volume of the materials measured in complementary chambers 33, 34 is automatically maintained constant irrespective of the position of adjustment of the corresponding partition 25.

It will be noted that by dropping the measured quantities of brine and peas in succession from the chambers 34, 33 through the openings 41, 43 directly into the underlying cans 19, no air can pocket in the voids between the peas as would be the case if the peas were first deposited in the cans 19 and the brine subsequently poured over them. By thus eliminating confinement or entrainment of air into the voids of the peas, the cans 19 may be rapidly filled and the existence of air in the finally sealed product is absolutely avoided. The speed and hence the capacity of the machine may also be considerably increased because the cans 19 are transported only rectilineally and are not caused to travel in a circular path. Waste of brine is positively eliminated as the quantites measured are of volume only sufficient to fill the portions of the cans which it is desired to finally fill. The various parts of the machine are readily accessible for inspection and the entire machine is safely manipulable by a single attendant.

It should be understood that it is not desired to limit the invention to the exact steps of the process and details of construction of the apparatus herein shown and described, for various modifications within the scope of the appended claims may occur to persons skilled in the art.

It is claimed and desired to secure by Letters Patent:

1. In a filling machine, downwardly movable measuring means for measuring definite quantities of granular material and of liquid, means for transporting a can beneath said measuring means, and means for successively delivering said measured quantities of liquid and of granular material from said pocket to said can.

2. In a filling machine, a downwardly movable measuring pocket divided into chambers for simultaneously measuring definite complementary quantities of granular material and of liquid, means for transporting a can beneath said pocket, and means for successively delivering first said measured quantity of liquid and then said measured quantity of granular material from said pocket to said can.

3. In a filling machine, downwardly movable measuring means for measuring definite quantities of granular material and of liquid, material conducting means movable beneath said measuring means, and means for successively delivering said measured quantities of liquid and of granular material through said conducting means while in motion.

4. In a filling machine, a downwardly movable measuring pocket divided into chambers for simultaneously measuring definite complementary quantities of granular material and of liquid, material conducting means movable beneath said pocket, and means for successively delivering first said measured quantity of liquid and then said measured quantity of granular material from said pocket through said conducting means while in motion.

5. In a filling machine, a downwardly movable measuring pocket divided into chambers for independently measuring definite quantities of granular material and of liquid, means for producing rectilineal movement of a can beneath said measuring means, and means for successively delivering said measured quantities of materials into said can while in motion.

6. In a filling machine, a measuring pocket revoluble about a horizontal axis and divided into chambers adapted to simultaneously measure definite quantities of granular material and of liquid, means for transporting a can beneath said pocket, and means for successively delivering said measured quantities of liquid and of granular material from said pocket to said can.

7. In a filling machine, a measuring pocket revoluble about a horizontal axis and divided into chambers adapted to simultaneously measure definite quantities of granular material and of liquid, material conducting means revoluble about a vertical axis and beneath said pocket, and means for successively delivering first said measured quantity of liquid and then said measured quantity of granular material through said conducting means while in motion.

8. In a can filling machine, a common filler head for simultaneously but independently measuring definite quantities of granular material and of liquid, means for delivering said measured quantity of liquid from said filler head to a can, and means for subsequently delivering said measured quantity of granular material from said filler head to the can.

9. In a can filling machine, a measuring pocket having segregated divisions for measuring definite quantities of granular material and of liquid respectively, means for delivering a measured quantity of liquid from said pocket to a can, and means for subsequently delivering a measured quantity of granular material from said pocket to said can.

10. In a can filling machine, means forming a pair of complementary chambers for simultaneously measuring definite independent quantities of granular material and of liquid, means for delivering a measured quantity of liquid from one of said chambers to a can, and means for subsequently delivering a measured quantity of granular material from the other of said chambers to said can.

11. In a can filling machine, a common filler head for simultaneously but independently measuring definite quantities of granular material and of liquid, means for effecting relative adjustment of the quantities of substances measured, means for delivering said measured quantity of liquid from said filler head to a can, and means for subsequently delivering said measured quantity of granular material from said filler head to said can.

12. In a can filling machine, a common filler head for independently measuring definite quantities of granular material and of liquid, common means for simultaneously effecting relative adjustment of the quantities of substances measured, means for delivering said measured quantity of liquid from said filler head to a can, and means for subsequently delivering said measured quantity of granular material from said filler head to said can.

13. In a can filling machine, a measuring pocket having segregated divisions for measuring definite quantities of granular material and of liquid respectively, means for effecting relative adjustment of the volumes of said pocket divisions, means for delivering a measured quantity of liquid from said pocket to a can, and means for subsequently delivering a measured quantity of granular material from said pocket to said can.

14. In a can filling machine, a measuring pocket having segregated divisions for simultaneously measuring definite quantities of granular material and of liquid respectively, common means for simultaneously effecting relative adjustment of the volumes of said pocket divisions, means for delivering a measured quantity of liquid from said pocket to a can, and means for subsequently delivering a measured quantity of granular material from said pocket to said can.

15. In a can filling machine, means forming a pair of complementary chambers for simultaneously measuring definite independent quantities of granular material and of liquid, means for effecting relative adjustment of the volumes of said chambers, means for delivering a measured quantity of liquid from one of said chambers to a can, and means for subsequently delivering a measured quantity of granular material from the other of said chambers to said can.

16. In a can filling machine, means forming a pair of complementary chambers for simultaneously measuring definite independent quantities of granular material and of liquid, common means for simultaneously effecting relative adjustment of the volumes of said chambers, means for delivering a measured quantity of liquid from one of said chambers to a can, and means for subsequently delivering a measured quantity of granular material from the other of said chambers to said can.

17. In a can filling machine, downwardly movable means for independently measuring definite quantities of granular material and of liquid, means for effecting adjustment of said measuring means to relatively vary the quantities of substances measured, the sum of the volumes of the measured quantities minus the volume of the voids in the measured quantity of granular material always being a constant amount, means for delivering the measured quantity of liquid to a can, and means for subsequently delivering the measured quantity of granular material to said can, said delivery means functioning in rapid succession.

18. In a can filling machine, means for independently measuring definite quantities of granular material and of liquid, common means for simultaneously effecting adjustment of said measuring means to relatively vary the quantities of substances measured, the sum of the volumes of the measured quantities minus the volume of the voids in the measured quantity of granular material always being a constant amount, means for delivering a measured quantity of liquid to a can, and means for subsequently delivering a complementary measured quantity of granular material to said can.

19. In a can filling machine, downwardly movable means for independently measuring definite quantities of granular material and of liquid, means for effecting adjustment of said measuring means to relatively vary the quantities of granular material and of liquid measured, the sum of the volumes of one measured quantity of each material minus the volume of the voids in the granular material always being a constant amount, and means for successively delivering a measured quantity of each material to each of a plurality of cans.

20. In a can filling machine, means for independently measuring definite quantities of granular material and of liquid, common means for simultaneously effecting adjustment of said measuring means to relatively vary the quantities of granular material and of liquid measured, the sum of the volumes of one measured quantity of each material minus the volume of the voids in the granular material always being a constant amount, and means for successively delivering a measured quantity of each material to each of a plurality of cans, said delivery means functioning in rapid succession with respect to each can.

21. In a filling machine, a measuring pocket revoluble about a horizontal axis and divided into chambers adapted to simultaneously measure definite quantities of granular material and of liquid, material conducting means revoluble about a vertical axis and beneath said pocket, means for transporting a can beneath said conducting means, and means for successively delivering said measured quantities of liquid and of granular material from said pocket through said conducting means to said can.

22. In a filling machine, a measuring pocket revoluble about a horizontal axis and divided into chambers adapted to simultaneously measure definite independent quantities of granular material and of liquid, material conducting means revoluble about a vertical axis and beneath said pocket, means for producing rectilineal movement of a can beneath said conducting means, and means for successively delivering said measured quantities of liquid and of granular material through said conducting means to said can while in motion.

23. In a can filling machine, a measuring pocket revoluble about a horizontal axis and divided into chambers adapted to simultaneously measure definite complementary quantities of granular material and of liquid, means for producing rectilineal movement of a can beneath said measuring means, material conducting means revoluble about a vertical axis and movable between said pocket and said can, and means for successively delivering first said measured quantity of liquid and then said measured quantity of granular material from said pocket through said conducting means into said can while in motion.

In testimony whereof, the signature of the inventor is affixed hereto.

OSWALD H. HANSEN.